(12) United States Patent  (10) Patent No.: US 8,246,844 B2
Quintel  (45) Date of Patent: Aug. 21, 2012

(54) METHOD FOR FOLDING A FILTER BAG AND A FOLDED FILTER BAG ARRANGEMENT

(75) Inventor: Mark Anthony Quintel, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 154 days.

(21) Appl. No.: 12/768,136

(22) Filed: Apr. 27, 2010

(65) Prior Publication Data

US 2011/0259809 A1 Oct. 27, 2011

(51) Int. Cl.
*B01D 37/00* (2006.01)

(52) U.S. Cl. ........ 210/791; 210/232; 210/238; 493/405; 493/409; 493/468; 493/474; 493/941; 493/243; 55/361; 55/DIG. 5; 55/381; 15/DIG. 8

(58) Field of Classification Search .......... None
See application file for complete search history.

(56) References Cited

U.S. PATENT DOCUMENTS

| | | | | |
|---|---|---|---|---|
| 3,333,523 | A * | 8/1967 | Terzuoli | 493/197 |
| 3,616,621 | A * | 11/1971 | Fesco | 55/367 |
| 3,738,091 | A * | 6/1973 | Fesco | 55/367 |
| 3,916,770 | A * | 11/1975 | Hanson | 493/189 |
| 4,155,727 | A * | 5/1979 | Kaulig | 55/381 |
| 4,545,833 | A * | 10/1985 | Tafara | 156/93 |
| 5,755,962 | A * | 5/1998 | Gershenson et al. | 210/452 |
| 5,972,059 | A * | 10/1999 | Morgan | 55/336 |
| 6,071,322 | A * | 6/2000 | Hulthen | 55/367 |
| 6,685,843 | B2 * | 2/2004 | Leaverton | 210/805 |
| 7,611,555 | B2 * | 11/2009 | Wattenberg et al. | 55/369 |
| 7,837,875 | B2 * | 11/2010 | Callaert et al. | 210/232 |
| 8,002,862 | B2 * | 8/2011 | Schultink | 55/367 |
| 2002/0056680 | A1 * | 5/2002 | Bourgeois | 210/232 |
| 2002/0100724 | A1 * | 8/2002 | Bourgeois | 210/495 |
| 2007/0108117 | A1 * | 5/2007 | Callaert et al. | 210/238 |
| 2007/0175190 | A1 * | 8/2007 | Schultink | 55/467 |
| 2011/0259809 | A1 * | 10/2011 | Quintel | 210/238 |

* cited by examiner

*Primary Examiner* — Robert James Popovics
(74) *Attorney, Agent, or Firm* — Daniel S. Kalka (57) ABSTRACT

A method of folding a filter bag 10 made from a nonwoven fabric or stiff media to facilitate installation within a filter retainer basket and a folded filter bag 10 arrangement.

7 Claims, 8 Drawing Sheets

METHOD FOR FOLDING A FILTER BAG AND A FOLDED FILTER BAG ARRANGEMENT

BACKGROUND OF THE DISCLOSURE

The present disclosure relates to a new method for folding a filter bag to facilitate installation in a filter retaining basket of a bag filter unit and the folded filter bag arrangement.

When removing a used filter bag from a liquid bag filter unit and replacing it with a new filter bag, the operator must make certain to install the new filter bag so that the bottom of the clean filter bag is in contact with the bottom of the filter retainer basket. Failure to do so can cause a filter bag to burst during normal operation of the filter unit, due to differential pressure across the unsupported bag media.

When filter bags are made of a stiff filter media, such as a nonwoven fabric or a polymeric material, and have seams which may be sewn, ultrasonically welded or hot gas welded, the operator may have a difficult time installing the new filter bag with the assurance of a proper, secure fit. This is largely due to a mismatch in geometry between the bag and basket. A filter bag contains a bottom seam that is welded or sewn while the filter bag is flat as opposed to the cylindrical shape of the filter retainer basket. This mismatch may require bag positioners or installation tools for proper supported installation.

Thus, there still exists a need for a folded filter bag arrangement to facilitate installation of a filter bag in a filter unit when replacing a filter bag, and a method for making drop-in filter bag easily installed when it is time for replacement, and eliminate the need for bag positioner or special installation tools.

BRIEF SUMMARY OF THE INVENTION

The present disclosure provides a novel method of folding a filter bag to facilitate installation. The present disclosure further provides a folded filter bag in an arrangement that allows an operator to replace a filter bag more easily and with less time. The bag also is installed in a manner that realizes benefits normally realized through the use of a bag positioner or installation tool.

The method of the present disclosure inserts a bag folding tool through the flange end of a filter bag. The corners of the bottom seam of the filter bag are pushed inwards towards the center of the bag. The opposite sides of the filter bag are also pushed inward along the length of the bag using the space between the tines of the bag folding tool as a guide to tuck a portion of each side of the filter bag in towards the center. The filter bag is flattened against the bag folding tool with the application of a force thereon. The flattened filter bag is then folded end-over-end starting from the bottom seam to provide a folded filter bag arrangement ready for installation in a filter bag retainer basket.

BRIEF DESCRIPTION OF THE DRAWINGS

The foregoing and other features of the subject disclosure will become more apparent upon a consideration of the following description taken in connection with the accompanying drawings wherein.

DETAILED DESCRIPTION OF THE PREFERRED EMBODIMENT

Figure 1:
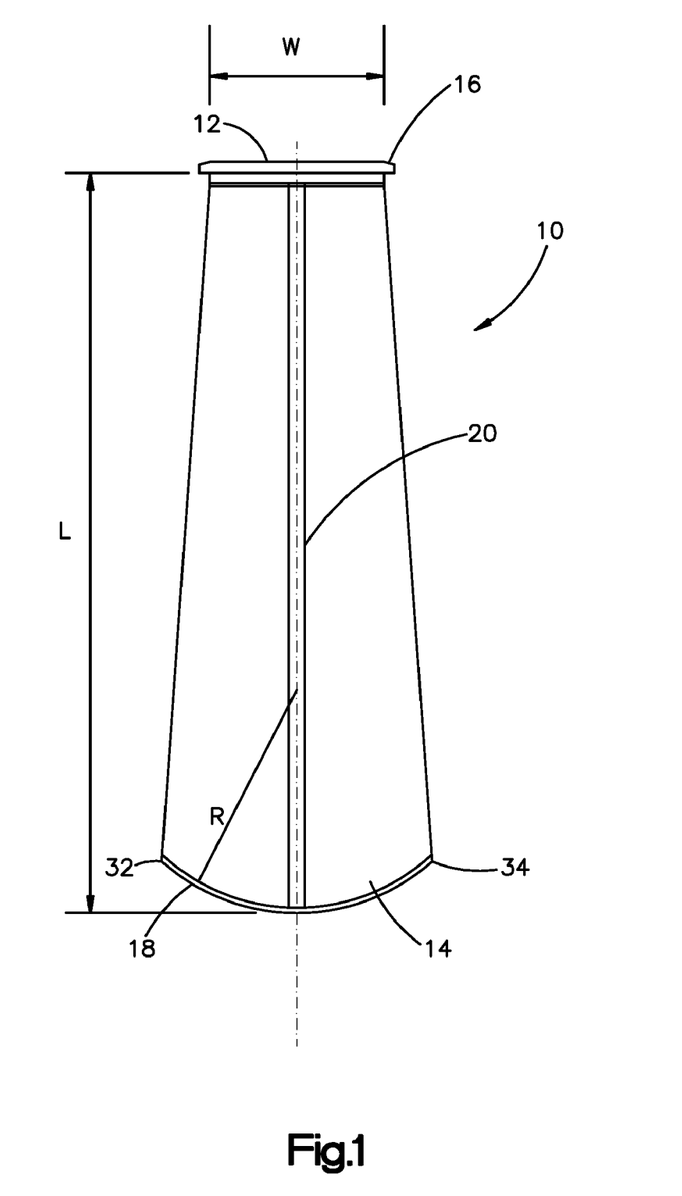
FIG. 1 is a frontal view of a filter bag.

The drawings which serve to depict the method of the present disclosure and steps thereto and the folded filter bag arrangement are not intended to limit the present disclosure. Like numerals designate like or similar features throughout the several views. FIG. 1 depicts a filter bag generally designated 10 constructed of a stiff filtering media which includes, but is not limited to, a nonwoven fabric or material, like a polymeric material such as a thermoplastic material or some other melt blown media. The process for manufacturing filter bag 10 is well known in the art and requires no detailed explanation here.

Filter bag 10 has an open end 12 and a closed end 14. The length L and width W of the filter bag 10 varies depending upon the size of the filter retainer basket (not shown) that the filter bag 10 is intended for use. Filter bag 10 should properly fit within the retainer basket when a filter bag is being replaced. The operator must make certain that the bottom or closed end 14 of the bag 10 is in contact with the bottom of the retainer basket. Otherwise, the bag may burst during normal operation of the filter unit.

For illustrative purposes only, for one commercial product referred to as a #2 filter bag arrangement, the length L of a commercially available filter bag may range from approximately 420 millimeters (mm) to approximately 535 mm. The width (W) of a filter bag may range from approximately 300 mm to approximately 525 mm. Of course, these dimensions can change with an application and can be much longer and/or wider.

Filter bag 10 includes a flange end or lid portion 16 attached at the open end 12 to allow the bag 10 to be held in place in the retainer basket in a known manner. The bottom or closed end 14 includes a seam 18 having an arc with a radius R that may be sealed by an ultrasonic weld or a hot gas weld or sewn. Radial seam 18 provides for a single seam at the closed end 14. In the fabrication of filter bag 10, a longitudinal seam 20 may extend substantially the length of the filter bag 10 as depicted in the example shown in FIG. 1. Longitudinal seam 20 may be sealed in a similar manner as radial seam 18.

Figure 2:
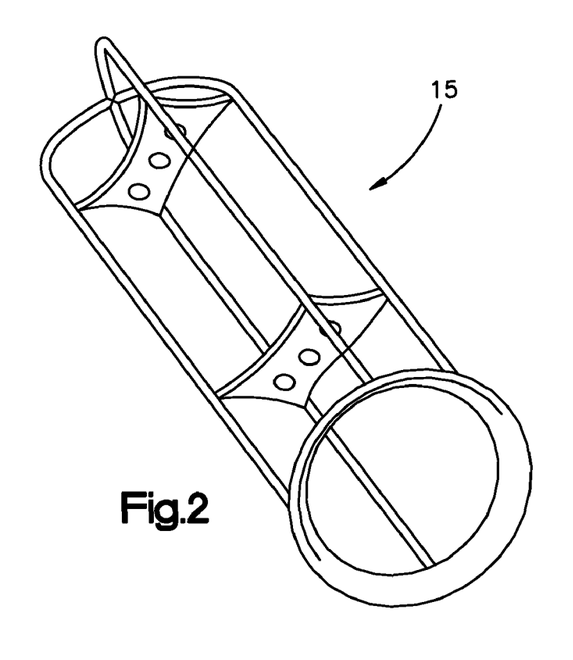
FIG. 2 is an elevated perspective view of a bag positioner or installation tool.

Because of the mismatch between the geometry of the filter bag 10 and the basket (not shown) that holds the filter bag 10, the operator may require a bag positioner or installation tool generally designated 15 as shown in FIG. 2 to install the filter bag 10 correctly. The positioner 15 stays in the bag 10 during normal operation and can be re-used. The bag positioner 15 adds additional initial cost to the operation of a filter unit. When a plant employs several multi-bag filter units with for example twelve bags inside each unit, the cost can range upwards to several thousands of dollars or more for the initial expense of operating the multi-bag filter units. When replacing a used bag, the operator must remove the bag positioner 15 from the used bag covered in dirt and insert it in a new bag. Once inserted, the corners at the bottom of the bag must be pushed into the center of the bag positioner 15. This increases the amount of time and effort an operator must spend in replacement of filter bags. Bag positioners or installation tools add extra time to the filter bag installation process and may be viewed as an inconvenience.

Figure 3:
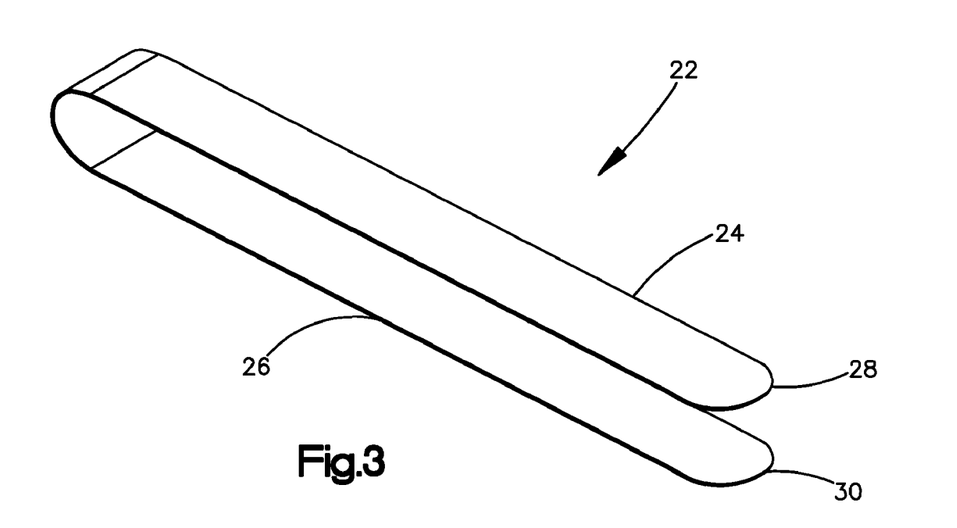
FIG. 3 is an elevated perspective view of a folding tool used with the method of the present disclosure.

Turning next to FIG. 3, there is depicted a bag folding tool 22 used with the method of the present disclosure. Tool 22 is an elongated flat member bent in a U-shape with two tines 24, 26 of substantially equal length and width. Tines 24, 26 have rounded ends 28, 30, respectively, as seen in FIG. 3 with all sharp edges of the tines 24, 26 that could potentially damage the filter bag smoothed or removed. Tool 22 may be made from stainless steel or any other suitable material for the purpose employed herein. Tool 22 has a length and width sized to correspond approximately to the size of the filter bag 10 as seen in FIG. 4.

Figure 4:
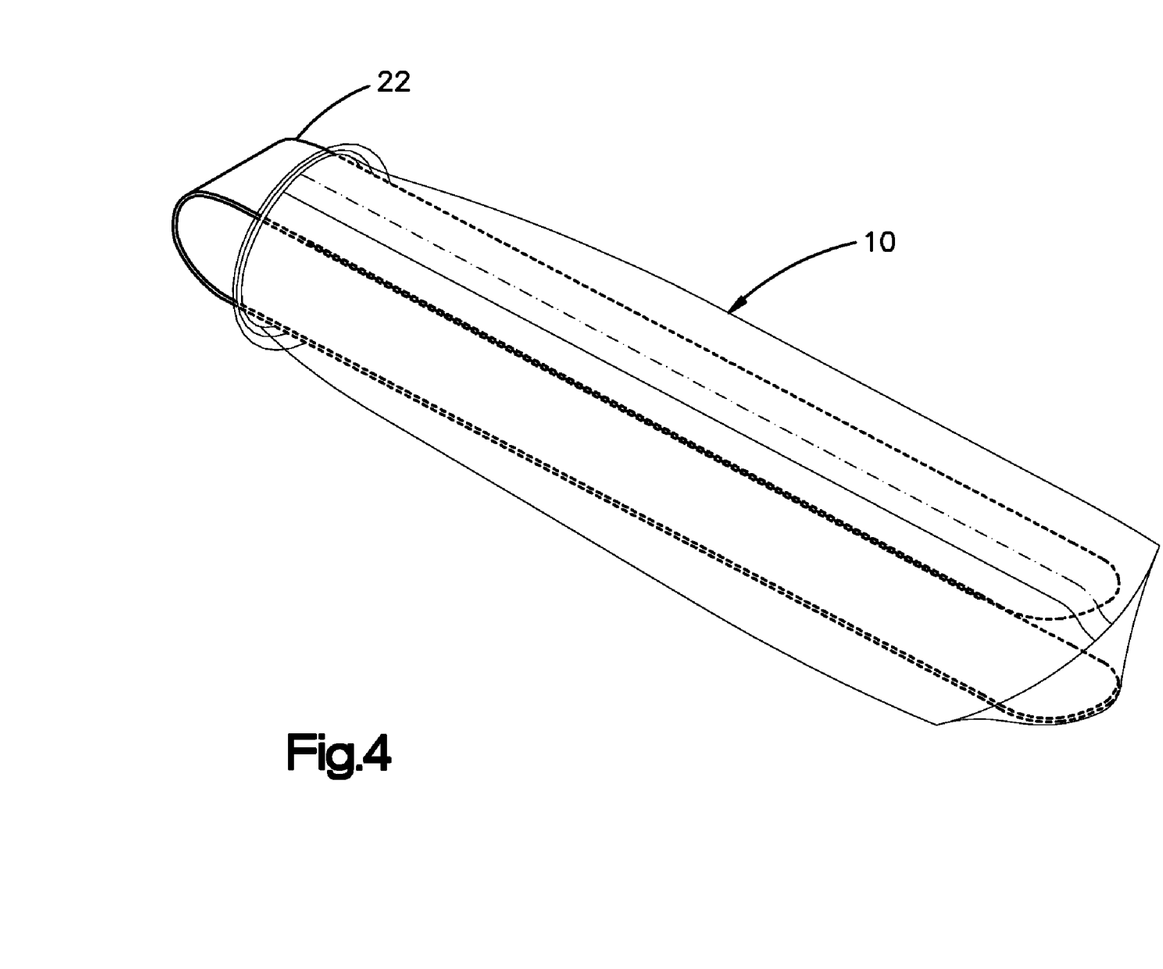
FIG. 4 is an elevated perspective view of the folding tool inserted in the filter bag.

FIG. 4 depicts the bag folding tool 22 inserted in filter bag 10. This step in the method of the present disclosure allows the bag folding tool to support the additional steps in folding the filter, bag as will be described in greater detail.

Figure 5:
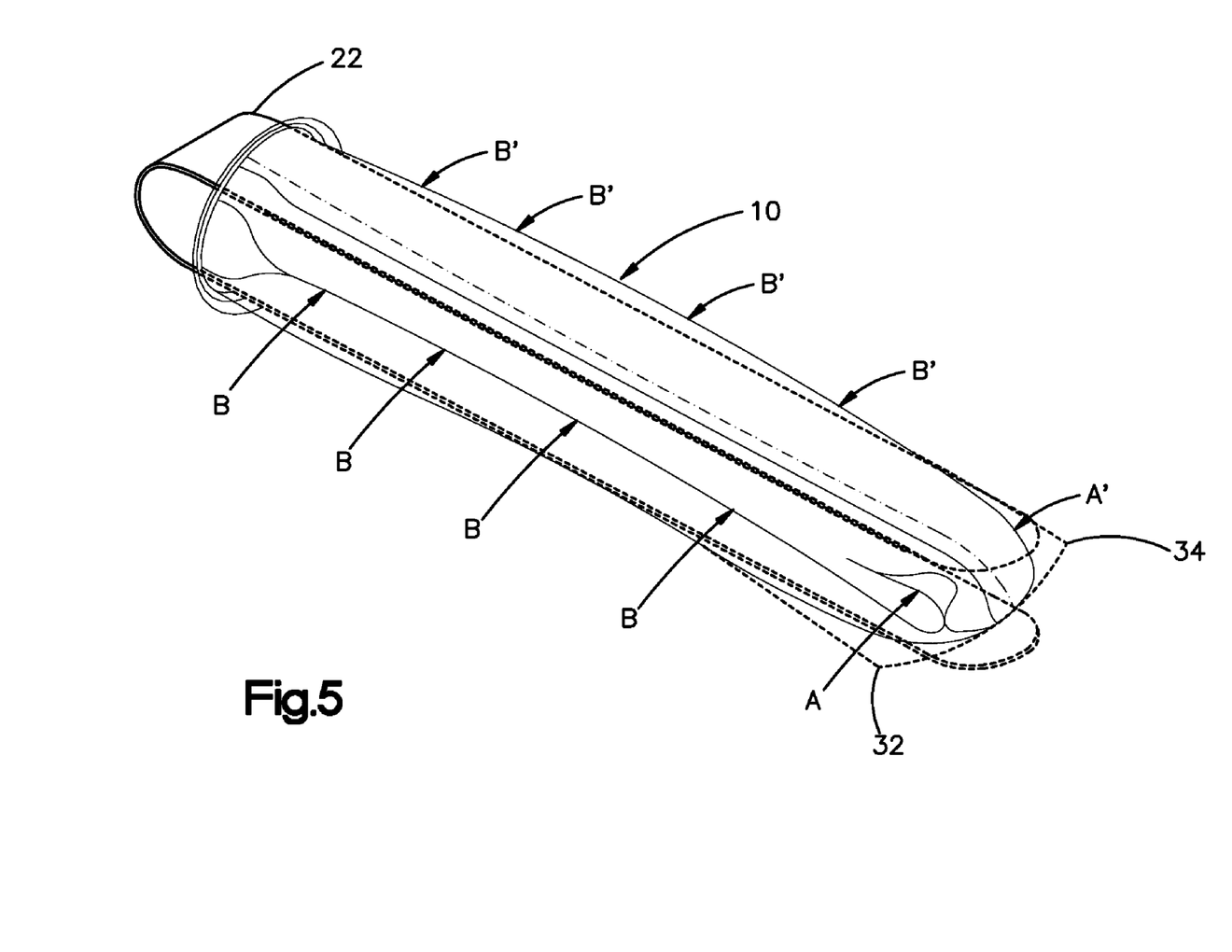
FIG. 5 is a view similar to FIG. 4 illustrating the step of pushing the corners of the bottom seam 32, 34 shown in dashed line inward towards the center of the bag and along the length of the bag.
Figures 6, 7:
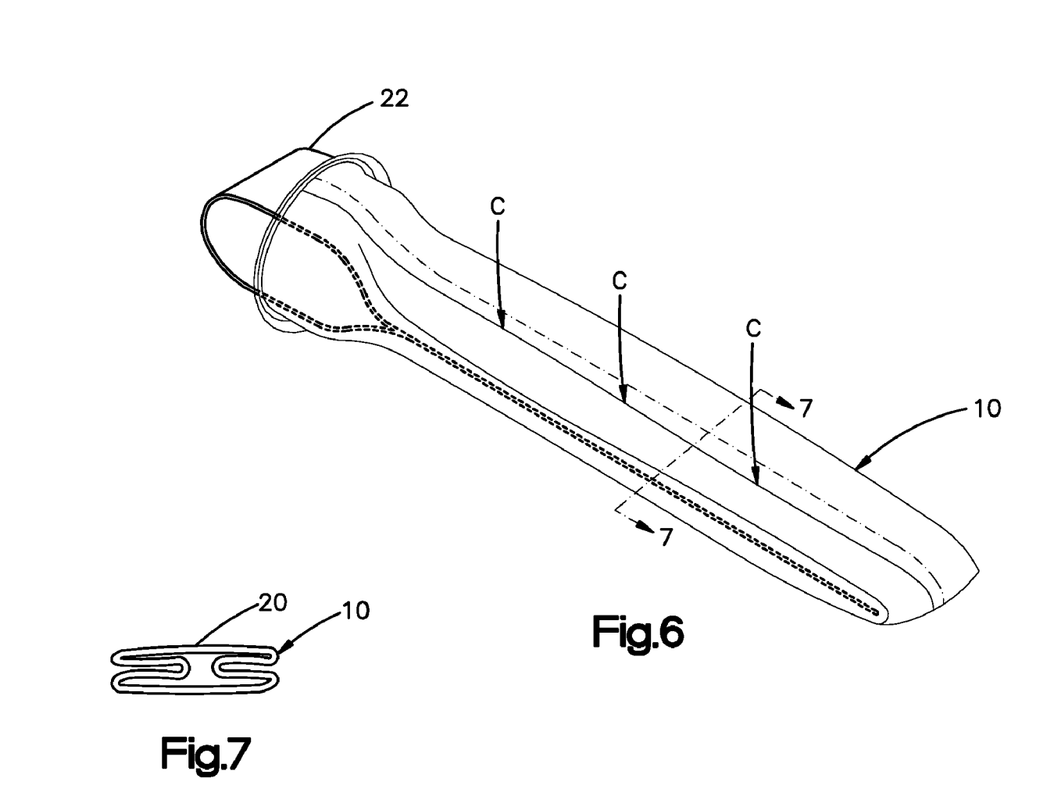
FIG. 6 is a perspective view of the filter bag 10 illustrating the steps of applying pressure as indicated by arrows C to flatten the filter bag.
FIG. 7 is a sectional view taken along lines 7-7 showing the filter bag folded after this step.

Tool 22 has a sufficient length and width to fit within filter bag 10 and provide support when folding the filter bag 10 as shown in FIGS. 5 and 6.

Referring to FIG. 5, corners 32, 34 of the seam 18 are pushed inward towards a center of the filter bag 10 as indicated by arrows A, A' on each side of the filter bag 10. Similarly, sides of filter bag 10 as indicated by arrows B, B' are pushed inward along the length of the filter bag 10 using the support of tines 24, 26 and the space therebetween to tuck a portion of each side of the filter bag 10 in towards the center of the filter bag 10.

FIG. 6 shows the step of applying force as indicated by arrows C sufficiently on a portion of the filter bag 10 against the tines 24, 26 of the bag folding tool 22 to flatten the filter bag 10 as shown in FIGS. 6 and 7.

Figure 8:
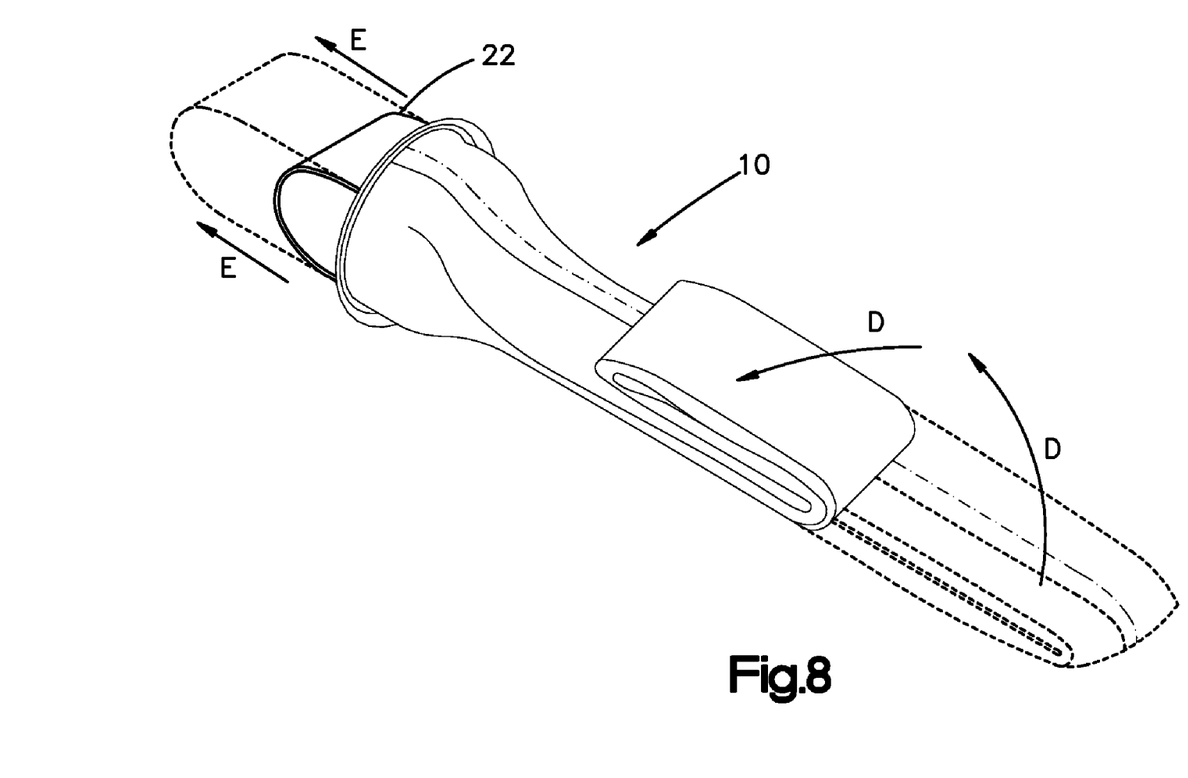
FIG. 8 is a perspective view of the filter bag 10 being folded end-over-end as indicated by arrows D according to the method of the present invention.

FIG. 8 illustrates how the flattened filter bag 10 from FIGS. 6 and 7 is folded end-over-end as indicated by arrows D. As filter bag 10 is being folded as shown by arrows D, the bag folding tool 22 is being withdrawn from filter bag 10 as indicated by arrows E.

Figure 9:
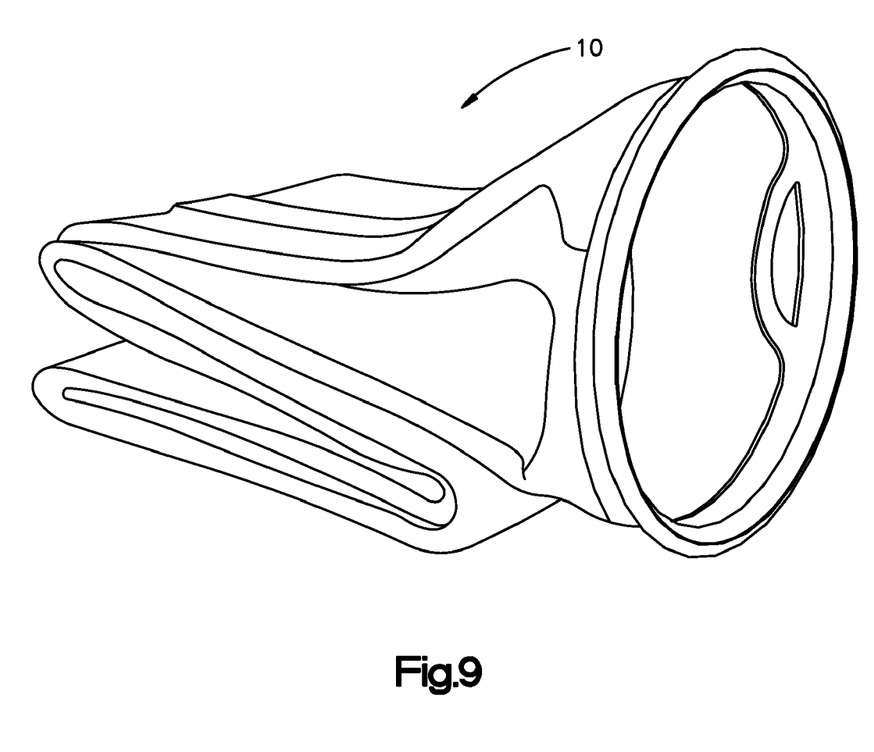
FIG. 9 is a perspective view of the folded arrangement of the filter bag 10; and, FIG. 10 is block diagram setting forth the steps of the method of the present disclosure.

The final folded arrangement of filter bag 10 shown in FIG. 9 is now ready for packaging and shipment. The folded filter bag 10 is ready for use by an operator to replace a dirty filter bag. This folded arrangement allows the operator to replace a dirty filter bag with a clean one by simply dropping the folded filter bag 10 into the correct position without the operator being required to do any folding or using any tools.

Figure 10:
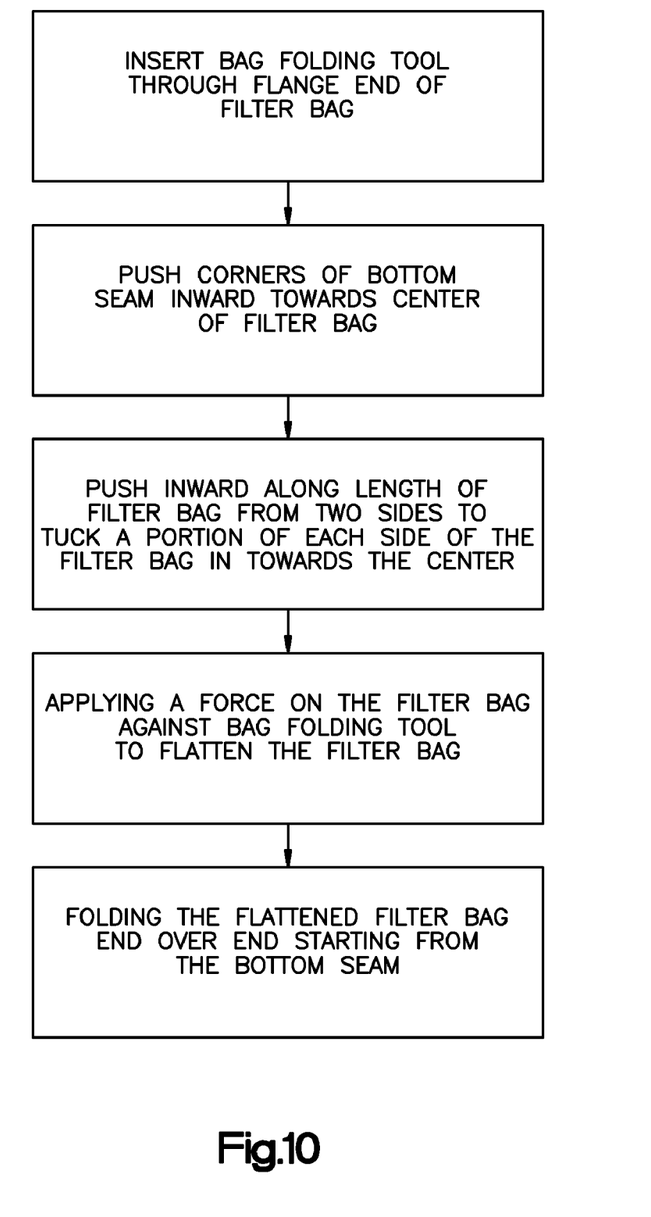

The steps of the method of the present disclosure are set forth in block diagram form in FIG. 10. The method of the present disclosure provides a folded filter bag 10 arrangement that may be done as the final steps in the manufacturing process, or at any time subsequent thereto. When provided in the folded arrangement, the folded filter bag 10 allows easy installation in the filter retainer basket in the correct position.

While specific embodiments of the present disclosure have been shown and described in detail to illustrate the application of the principles of the present disclosure, it will be understood that the method and folded filter bag arrangement of the disclosure may be embodied otherwise without departing from such principles.

I claim:

1. A method for folding a filter bag in an arrangement intended to facilitate replacement of a filter bag in a filter unit having a filter retainer basket, comprising the steps of:
    inserting a bag folding tool through a flange end of a filter bag;
    pushing corners of a bottom seam inward towards a center of the filter bag;
    pushing inward along a length of the filter bag from opposite sides to tuck a portion of each side of the filter bag in towards the center of the filter bag;
    applying force on the filter bag against the bag folding tool to flatten the filter bag; and,
    folding the filter bag end-over-end starting from the bottom seam.

2. A method according to claim 1, wherein the folding step includes the step of sliding the folding tool out from the filter bag during the folding step.

3. A method according to claim 1, wherein the filter bag is constructed of a fabric material.

4. A method according to claim 1, wherein the filter bag is manufactured from a thermoplastic fabric material.

5. A method according to claim 1, wherein the filter bag is manufactured from a melt blown media.

6. A method according to claim 1, wherein the folding tool comprises an elongated member bent in a U-shape, having two flat tines.

7. A method according to claim 1, wherein the filter bag is made from a nonwoven fabric.

* * * * *